United States Patent [19]

Campbell

[11] Patent Number: 5,138,726
[45] Date of Patent: Aug. 18, 1992

[54] BIDET ATTACHMENT

[76] Inventor: John G. Campbell, 601 W. Northgate, Irving, Tex. 75062

[21] Appl. No.: 461,927

[22] Filed: Jan. 8, 1990

[51] Int. Cl.5 .................. A47K 3/22; A47K 11/08
[52] U.S. Cl. ............................ 4/420.4; 4/447; 279/14; 408/72 R; 285/197; 137/317
[58] Field of Search ............... 4/447, 448, 420.2, 420.4, 4/420.1, 420.5, 444, 445, 443, 446; 279/14; 408/72 R, 72 B, 115 R, 115 B; 285/56, 58, 64, 412, 415, 197, 242, 255; 137/317; 248/230

[56] References Cited

U.S. PATENT DOCUMENTS

| | | | |
|---|---|---|---|
| 327,969 | 10/1885 | Stowe | 279/14 |
| 1,697,414 | 1/1929 | Cordray | 279/14 |
| 1,791,385 | 2/1931 | Skuttle | 285/197 X |
| 2,002,383 | 5/1935 | Witt | 137/317 X |
| 2,504,257 | 4/1950 | Dunn | 4/447 |
| 2,510,910 | 6/1950 | Schulpen | 251/67 C |
| 2,842,331 | 7/1958 | Anderson | 251/6 |
| 3,044,076 | 7/1962 | Martini | 4/420.2 |
| 3,195,148 | 7/1965 | Merkel, Jr. | 4/447 |
| 3,215,395 | 11/1965 | Gorbor | 251/6 |
| 3,247,524 | 4/1966 | Umann | 4/447 X |
| 3,425,066 | 2/1969 | Berger | 4/448 X |
| 3,570,015 | 3/1971 | Rosengaus | 4/420.4 |
| 3,975,068 | 8/1976 | Speckin | 248/230 X |
| 4,028,745 | 6/1977 | Caniglia | 4/420.2 |
| 4,041,553 | 8/1977 | Sussman | 4/447 |
| 4,068,325 | 1/1978 | Benthin | 4/420.4 |
| 4,069,519 | 1/1978 | Alexander | 4/447 |
| 4,073,515 | 2/1978 | Perera | 285/197 X |
| 4,087,868 | 5/1978 | Gentz | 4/447 |
| 4,135,255 | 1/1979 | Menendez | 4/448 |
| 4,140,155 | 2/1979 | Tannery | 285/197 X |
| 4,181,985 | 1/1980 | Rius | 4/420.4 X |
| 4,197,594 | 4/1980 | Butterfield | 4/448 |
| 4,261,388 | 4/1981 | Shelton | 251/6 |
| 4,334,329 | 6/1982 | Miyanaga | 4/443 |
| 4,370,764 | 2/1983 | Ando et al. | 4/443 |
| 4,391,004 | 6/1983 | Kawai et al. | 4/443 |
| 4,406,025 | 9/1983 | Huck et al. | 4/443 |
| 4,510,630 | 4/1985 | Osgood | 4/443 |
| 4,513,923 | 4/1985 | Uhics | 248/230 X |
| 4,524,944 | 6/1985 | Sussman | 251/6 |
| 4,616,801 | 10/1986 | Cewers et al. | 251/6 |
| 4,676,703 | 6/1987 | Swanson | 279/14 |

OTHER PUBLICATIONS

Baumeister, Avallone, Baumeister, Marks' Standard Handbook for Mechanical Engineers, 1978, McGraw-Hill Inc. pp. 8-12 and 8-14.

Primary Examiner—Henry J. Recla
Assistant Examiner—Casey Jacyna
Attorney, Agent, or Firm—Timmons & Kelly

[57] ABSTRACT

Disclosed is a bidet attachment for mounting on a standard toilet. A nozzle is mounted on the underside of the toilet seat. Water is supplied to the nozzle through a conduit from a water supply pipe. The conduit is connected to the pipe with a T-tap having two halves. The two halves are bolted together and a hole is drilled through the pipe using a special tool. The conduit is secured to the T-tap with a crimping collar that slides over a tapered extension on the T-tap. Water flow rate is controlled by a cam valve. The cam valve can be opened and closed with a control handle to place a selected amount of squeeze on the conduit to allow a selected amount of water to flow through the conduit.

10 Claims, 1 Drawing Sheet

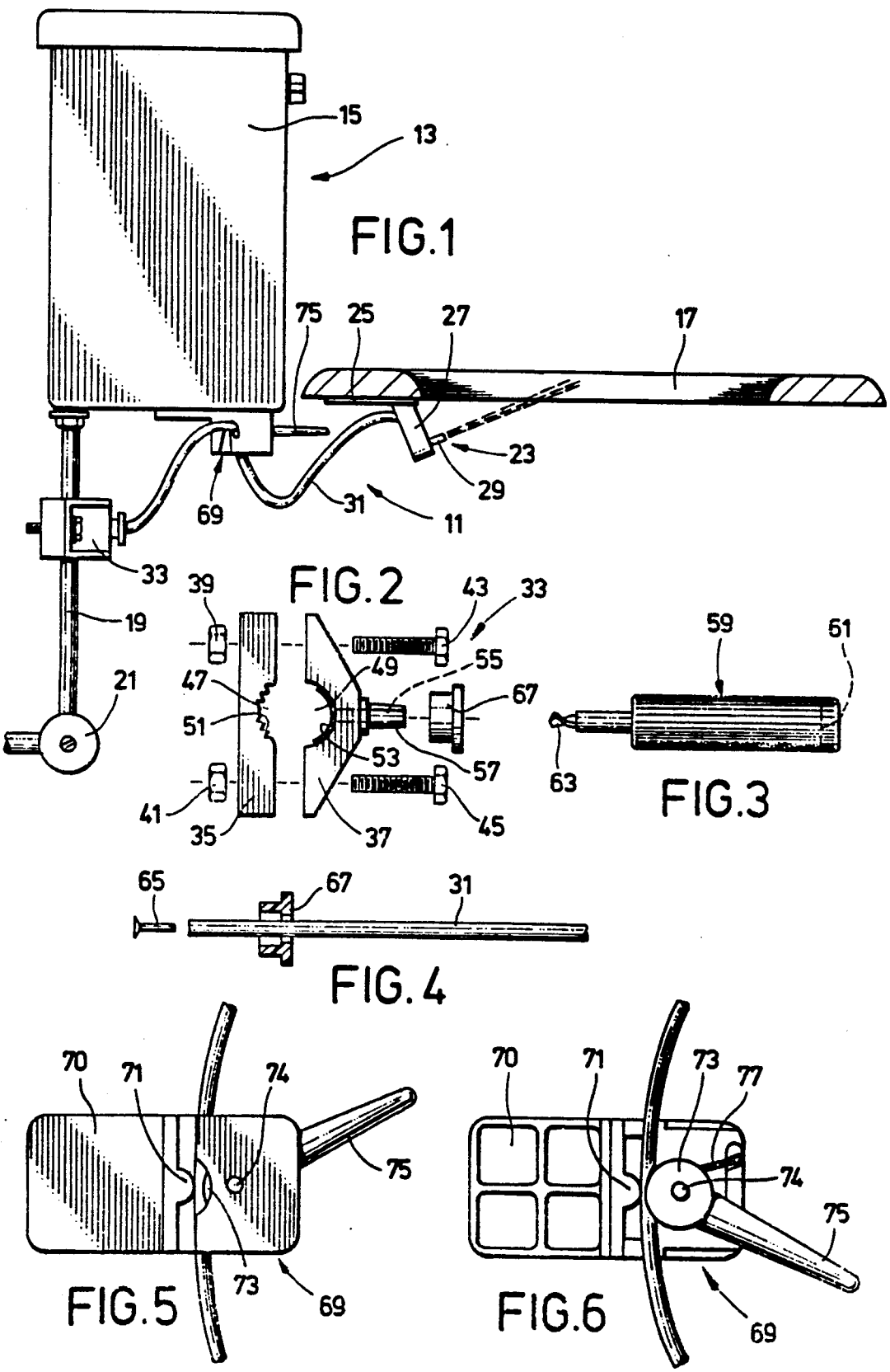

BIDET ATTACHMENT

BACKGROUND OF THE INVENTION

1. Field of the Invention

This invention relates in general to bidets for cleaning the rectal and genital areas of the human body. In particular, the invention relates to a bidet attachment adapted to be mounted on a conventional toilet.

2. Description of the Prior Art

The bidet has long been recognized as a highly effective device for cleaning the rectal and genital areas of the human body. In the United States, the general public has been slow to accept the bidet, so few houses have been built with bidets included. However, many Americans have discovered the benefits of bidets. For those who would like to use a bidet, bidet attachments have been developed to be mounted on a standard toilet.

For example, such a bidet attachment is shown in U.S. Pat. No. 3,425,066, issued on Feb. 4, 1969, to Berger. The Berger attachment includes a nozzle mounted on the toilet below the toilet seat. Water flow is controlled by a hand operated valve. The valve is connected to a fitting interposed in the water supply pipe that supplies water to the toilet.

U.S. Pat. No. 4,181,985, issued Jan. 8, 1980, to Rius, discloses a bidet attachment that also has a nozzle mounted below the toilet seat. Water flow is controlled by a valve on the water supply pipe.

U.S. Pat. No. 4,041,553, issued Aug. 16, 1977, to Sussman, shows another bidet attachment. Water flow is controlled by two valves. Water is supplied to the valves through flexible hoses connected to hot and cold water risers under a bathroom sink. The hoses are connected to the risers with self-tapping valves having two halves. A lance passes through a hole in one half of the valve and pierces the tubing of the riser. When the self-tapping valve is used on steel or brass pipe, it is necessary to hand drill a small hole and then attach the two halves of the valve.

Prior art bidet attachments have generally been relatively expensive. Many prior art devices include complex temperature sensing and water heating equipment. Such devices are electrically operated and thus are subject to failure and present a possible shock hazard. Also, if the temperature sensing equipment fails, the overly heated water may cause painful burns.

SUMMARY OF THE INVENTION

The bidet attachment of the invention is inexpensive and easy for a typical home owner to install. The attachment includes a nozzle and a mount for mounting the nozzle to the underside of a toilet seat. When the nozzle is properly mounted, the nozzle directs a spray of water upward toward the approximate center of the toilet seat.

Water is supplied to the nozzle through a small flexible water conduit. The water conduit is connected to a water supply, such as the water supply pipe behind the toilet. The T-tap connecting the water conduit to the water supply pipe has two halves. The two halves of the tap are placed on either side of the pipe and then bolted together.

The bolts can be tightened with a small tool, provided with the attachment kit. The same tool can also be used to drill or punch a hole in the water supply pipe. The tool passes through a hole in one half of the tap and into the pipe. The tool is then removed and the water conduit inserted into the hole. A crimping collar is used to crimp the tap onto the water conduit to secure the conduit in the hole.

Water flow through the conduit is controlled by a cam valve conveniently attached to the toilet within reach of a person sitting on the toiler seat. The control handle of the cam valve can be pivoted between a closed position and a fully open position to apply a selected amount of pressure on the conduit. A helical spring biases the cam valve in the closed position, so that not water will flow through the conduit unless the cam valve is held open.

BRIEF DESCRIPTION OF THE DRAWINGS

FIG. 1 is a side view of the bidet attachment of the invention mounted on a typical toilet.

FIG. 2 is a top view of a T-tap.

FIG. 3 is a side view of a combination tool for use in installing the bidet attachment of the invention.

FIG. 4 is a sectional view of a crimping collar through which the water conduit passes.

FIG. 5 is a bottom view of a cam valve of the invention, shown in the fully open position.

FIG. 6 is a sectional view of the cam valve shown in FIG. 5, with the cam valve shown in the closed position.

DESCRIPTION OF THE PREFERRED EMBODIMENT

As shown in FIG. 1, the bidet attachment 11 of the invention is designed to be attached to a standard toilet 13. The standard toilet 13 has a water tank 15 and a toilet seat 17. The seat 17 is mounted on a toilet bowl, not shown in the drawings.

A water supply pipe 19 supplies water to the water tank 15. A cut-off valve 21 is located on the water supply pipe 19, so that the water pressure can be shut off.

The bidet attachment 11 includes a nozzle assembly 23. The nozzle assembly 23 has a base 25 approximately two inches long and one inch wide. A piece of double sided tape is used to mount the base 25 of the nozzle assembly 23 to the underside of the toilet seat 17.

The body 27 of the nozzle assembly 23 extends downward from the base 25 at an angle of approximately eighty-five degrees. The body 27 houses a copper or brass nozzle 29 having an inside diameter of less than one sixteenth of an inch. The nozzle 29 is located approximately one and one quarter inch below the underside of the toilet seat 17 and directs water upward at an angle toward the approximate center of the toilet seat 17. Alternatively, the angle between the body 27 and the base 25 of the nozzle assembly 23 could be variable, in order to adjust the angle at which the water is directed by three or four degrees.

Water is supplied to the nozzle assembly 23 through a flexible water conduit 31. The conduit 31 is preferably polyurethane tubing having an inside diameter of one sixteenth inch and an outside diameter of one eighth inch. Since the inside diameter of the nozzle 29 is smaller than the inside diameter of the conduit 31, water pressure lost as the water flows through the length of the conduit 31 is restored.

The water conduit 31 is connected to the water supply pipe 19 by a T-tap 33 or a similar connection. The T-tap 33, shown in FIGS. 1 and 2, has two halves 35 and 37. The two halves 35 and 37 of the T-tap 33 are connected together by a pair of nuts 39 and 41 and bolts 43 and 45. The halves 35 and 37 of the T-tap 33 each have grooves 47 and 49 for receiving the water supply pipe 19. One groove 47 has teeth 51 to prevent the T-tap 33 from rotating around the pipe 19. The other groove holds an elastic neoprene seal 53.

A hole 55 passes through one of the halves 37 and the seal 53. A tapered extension 57 is aligned with the hole 55 in the T-tap 33.

FIG. 3 illustrates a tool 59 used in the installation of the bidet attachment 11 of the invention. A hexagonal inset 61 on one end of the tool 59 can be used to tighten the bolts 43 and 45. The nuts 39 and 41 are set in the plastic of the T-tap and will not turn as the bolts 43 and 45 are tightened.

A drill 63 is located on the opposite end of the tool 59. The drill 63 can be inserted through the extension 57 and the hole 55 in the T-tap half 37 and the seal 53 to drill a hole in the water supply pipe 19. The drill 63 is preferably sharpened to a pitch of ninety degrees, so that the drill 63 will drill the hole more efficiently. Alternatively, the drill 63 could be a lance for punching a hole in the pipe 19.

The water conduit 31 is then cut to the required length, generally about two feet. A small copper eyelet 65 is inserted into the end of the conduit 31, and the end of the conduit 31, as shown in FIG. 4, is inserted into the hole 55 in the T-tap 33. The conduit 31 is secured within the T-tap 33 with a crimping collar 67. The crimping collar 67 slides over the extension 57 and compresses the extension 57 against the conduit 31, and eyelet 65.

Water flow through the conduit 31 is controlled by a cam valve 69, shown in detail in FIGS. 5 and 6. The cam valve 69 has a base 70 approximately two inches long and one inch wide. The base 70 of the cam valve 69 is attached to the water tank 15 with a piece of double sided tape.

The water conduit 31 passes through the cam valve 69 and one side of the conduit 31 is held against a pincher 71 on the base 70. The other side of the conduit 31 is contacted by a cam 73. The cam 73 pivots about a pin 74 extending downward from the base 70 of the cam valve 69 and can be pivoted between a fully open position, shown in FIG. 5, and a closed position, shown in FIG. 6. In the open position, the cam 73 puts very little pressure on the conduit 31, and allows maximum flow. In the closed position, the cam 73 pinches the conduit 31 against the pincher 71 and cuts off the flow of water.

The cam 73 is pivoted by a control handle 75. A helical spring 77 biases the control handle 75 and the cam 73 in the closed position. Thus, when the control handle 75 is released, the spring 77 causes the handle 75 and the cam 73 to close and to cut off the flow of water.

The bidet attachment 11 of the invention is easily installed on a standard toilet 13. The nozzle assembly 23 is attached to the underside of the toilet seat 17 and the cam valve 69 is attached to the water tank 15 using double sided tape. The conduit 31 is attached to the nozzle assembly 23 and inserted into the cam valve 69 between the pincher 71 and the cam 73.

The conduit is then attached to the water supply pipe 19. The two halves 35 and 37 of the T-tap 33 are placed around the pipe 19 and bolted together using the tool 59. The cut-off valve 21 is turned off. Then, the tool 59 is inserted through the hole 55 in the T-tap 33 and a hole is drilled into the pipe 19.

The conduit 31 is cut to length and the eyelet 65 is inserted into the end of the conduit 31. The end of the conduit 31 is then inserted into the hole 55 in the T-tap 33. The crimping collar 67 is pushed down onto the extension 57 to pinch the extension onto the conduit 31 to secure the conduit 31 to the T-tap 33. The cut-off valve 21 is then reopened.

The bidet attachment 11 is then ready for use. A person sitting on the toilet seat 17 can easily reach the control handle 75 on the cam valve 69. The control handle 75 is pivoted toward the fully open position until the desired rate of flow is reached. When the control handle 75 is released, the spring 77 automatically closes the cam valve 69 and shuts off the water flow.

The bidet attachment 11 of the invention has several advantages over the prior art. First, the bidet attachment 11 can be manufactured very inexpensively. All of the plastic parts can be molded at a single time, and all of the other components are relatively inexpensive.

The bidet attachment 11 is also easy to install. The T-tap 33 easily attaches the conduit 31 to the water supply pipe 19. The cam valve 69 is easy to install, dependable, and easy to repair, if necessary.

Further, the cam valve 69 is a simple, effective way to control the water flow through the nozzle 29. The cam valve 69 can be easily opened to allow water flow, and when the cam valve 69 is released the water flow is automatically shut off.

The small size of the nozzle 29 creates a very small stream of water. Therefore, in the short time that the bidet attachment is used, only a small quantity of water is used. That small amount of water is stored within the length of the water conduit 31. Therefore, between uses the water for the next use is stored within the water conduit 31, and is cooling or warming to room temperature. This feature of the invention avoids the use of water that is excessively hot or cold.

The invention has been shown in only one embodiment. It should be apparent to those skilled in the art that the invention is not so limited, but is susceptible to various changes and modifications without departing from the spirit of the invention.

I claim:

1. A bidet attachment for mounting on a toilet having a toilet seat, the bidet attachment comprising:
   a nozzle assembly including a base, a body disposed at a predetermined angle from said base, and a nozzle emerging outward of said body;
   an adhesive mount for mounting the base of said nozzle assembly to the underside of the toilet seat for said nozzle to direct water passing through the body of the nozzle assembly upward toward the approximate center of the toilet seat;
   a length of flexible water conduit extending between first and second ends for conducting water through said first end to the nozzle body;
   an eyelet disposed in said water conduit at the second of said ends;
   a T-tap for connecting the second end of said water conduit to a received water supply pipe for supplying water to the water conduit, wherein the T-tap comprises two halves that are placed on either side of the water supply pipe and then connected together for enabling a flow aperture to be formed in the received water supply pipe thereat;
   an elastomeric extension on one of the halves of the T-tap, the extension having a tapered outer surface and an internal bore in open communication with the aperture formed in the water pipe and within which to receive the second end of said water conduit;

a threadless crimping collar to overfit said extension for connecting the second end of said water conduit to the T-tap, the crimping collar having an annular inner surface that when forced onto the tapered extension on the T-tap threadlessly compresses the extension against the received second end of said water conduit;

a cam valve in relatively close proximity to the toilet seat and through which to receive the water conduit at a location intermediate its ends, said cam valve having a cam that can be hand pivoted from within arms reach of the toilet seat between a closed position and an open position to selectively restrict water flow in the water conduit and allow a selected amount of water to flow through the water conduit to said nozzle assembly; and a biasing spring urging said cam toward the normally closed position of said cam valve.

2. A bidet attachment as defined in claim 1, wherein the two halves of the T-tap are bolted together.

3. A bidet attachment as defined in claim 2, in which at least one of the two halves of said T-tap includes a hole therein, and further comprising a combination tool for tightening the bolts and for drilling a hole in the water supply pipe in alignment with the hole in one of the two halves of the T-tap.

4. A bidet attachment as defined in claim 1, wherein the two halves of the T-tap each has a groove for receiving the water supply pip, one of the groves having teeth to prevent the T-tap from rotating about the pipe and the other groove holding an elastic seal.

5. A bidet attachment for mounting on a toilet having a toilet seat, the bidet attachment comprising:

a nozzle assembly including a base, a body disposed at a predetermined angle from said base, and a nozzle emerging outward of said body;

an adhesive mount for mounting the base of the nozzle assembly to the underside of the toilet seat for said nozzle to direct water passing through the body of the nozzle assembly upward toward the approximate center of the toilet seat;

a length of flexible water conduit extending between first and second ends for conducting water through said first end to the nozzle body;

an eyelet disposed in said water conduit at the second of said ends;

a T-tap for connecting the second end of said water conduit to a received water supply pipe for supplying water to the water conduit, wherein the T-tap comprises two halves that are placed on either side of the water supply pipe and then connected together with nuts and bolts for enabling a flow aperture to be formed in the received water supply pipe thereat, one of the two halves of the T-tap having a hole therein;

an elastomeric extension on one of the halves of the T-tap, the extension having a tapered outer surface and an internal bore in open communication with the hole in said T-tap and within which to receive the second end of said water conduit;

a threadless crimping collar to overfit said extension for connecting the second end of said water conduit to the T-tap, the crimping collar having an annular inner surface that when forced onto the tapered extension on the T-tap threadlessly compresses the extension against the received second end of said water conduit;

a cam valve in relatively close proximity to the toilet seat and through which to receive the water conduit at a location intermediate its ends, said cam valve having a cam that can be hand pivoted from within arms reach of the toilet seat between a closed position and an open position to selectively restrict water flow in the water conduit and allow a selected amount of water to flow through the water conduit to said nozzle assembly; and a combination tool for tightening the nuts and bolts and for drilling a hole on the water supply pipe in alignment with the hole in one of the two halves of the T-tap.

6. A bidet attachment as defined in claim 5, wherein the water conduit has an inside diameter of approximately one sixteenth inch and the inside diameter of the nozzle is less than the inside diameter of the water conduit.

7. A bidet attachment as defined in claim 6, wherein the amount of water normally to be used in a single use is stored within the water conduit.

8. A bidet attachment as defined in claim 7, wherein the water stored in the water conduit can equalize to room temperature.

9. A bidet attachment as defined in claim 5, wherein the amount of water normally to be used in a single use is stored within the water conduit.

10. A bidet attachment as defined in claim 5, wherein the two halves of the T-tap each has a groove for receiving the water supply pipe, one of the grooves having teeth to prevent the T-tap from rotating about the pipe and the other groove holding an elastic seal.

* * * * *